United States Patent [19]

Han

[11] Patent Number: 4,848,029
[45] Date of Patent: Jul. 18, 1989

[54] WATERING DEVICE FOR PLANTS

[76] Inventor: Joon Ho Han, 816 Gregorio Dr., Silver Spring, Md. 20901

[21] Appl. No.: 165,735

[22] Filed: Mar. 9, 1988

[51] Int. Cl.⁴ .............................................. A01G 25/00
[52] U.S. Cl. .......................................................... 47/79
[58] Field of Search ................ 47/27, 61, 79, 48.5; 222/463; 248/323–325, 331, 332, 343

[56] References Cited

U.S. PATENT DOCUMENTS

| 91,413 | 6/1869 | Burley | 137/406 |
|---|---|---|---|
| 1,668,793 | 5/1928 | Wiggins | 222/64 |
| 2,198,309 | 4/1940 | James | 47/79 |
| 4,060,934 | 12/1977 | Skaggs | 47/79 |

FOREIGN PATENT DOCUMENTS

| 841340 | 5/1939 | France | 47/79 |
|---|---|---|---|
| 1070140 | 1/1953 | France | 47/79 |
| 2095083 | 9/1982 | United Kingdom | 47/81 |

Primary Examiner—Robert A. Hafer
Assistant Examiner—Charles H. Sam
Attorney, Agent, or Firm—Birch, Stewart, Kolasch & Birch

[57] ABSTRACT

A watering device for plants which comprises horizontal parallel pivot rods and a plant container which is balanced on one of the horizontal pivot rods by an adjusting weight member slidably disposed at the other horizontal pivot rod, and a water reservoir tank is operatively associated with the plant container so that as the plant container becomes lighter as to a loss of water. The adjusting weight member operatively associated with the plant container actuates a valve in the water reservoir tank through a transfer member mounted to third one of horizontal parallel pivot rods and transfer water from the water reservoir tank to the plant container until a balance is again achieved, and when the balance is reached, the valve in the water tank is again closed.

5 Claims, 2 Drawing Sheets

WATERING DEVICE FOR PLANTS

CROSS REFERENCE TO RELATED APPLICATION

This application is related to application Ser. No. 043,756 entitled "WATERING DEVICE FOR PLANTS" filed Apr. 29, 1987, which is hereby incorporated by reference.

BACKGROUND OF THE INVENTION

The present invention relates to a watering device for plants which are grown in the home or in a greenhouse and more particularly, to an improved automatic watering device for responsive to water loss by the plants.

There are many types of automatic plant watering apparatus which are well known in the prior art which utilize a system which is actuated in response to water loss by the plants. However, these apparatus suffer from a number of disadvantages such as, for example, they require complex mechanisms to operate and they are difficult to install in that a variety of complex apparatus are required to assemble them. Furthermore, they are provided with an elevated water reservoir with a spring loaded valve therein which is actuated by the loss of weight of water by the plants in a container supported by the spring. Since the springs lose their strength as the temperature increases, plants are frequently overwatered on hot days. In addition, there are several types of apparatus which utilizes a counter weight member in such as disclosed in U.S. Pat. No. 4,060,934. Such apparatus, however, are used with a plant container which must be placed on the floor or ground. They cannot be utilized with plant containers which must be hung from a ceiling, a wall or the like.

OBJECTS AND SUMMARY OF THE INVENTION

Accordingly, it is an object of the present invention to provide an improved watering device for plants.

Another object of the present invention is to provide an automatic watering device responsive to water loss by the plants which are grown in the home or in a greenhouse.

Yet another object of the present invention is to provide a watering device for hanging plants, which is structured with three horizontal parallel pivot rods wherein a plant container is slidably mounted to a first pivot rod thereof, a connecting member is slidably mounted to a second pivot rod disposed at one end portion thereof, and an adjusting weight member is slidably mounted to a third pivot rod thereof so that the plant container can be automatically watered by sensing the amount of water weight loss in the plant container.

A further object of the present invention is to provide a watering device for plants, which is easy to assemble or operate and inexpensive to manufacture.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention relates to a watering device for plants which comprises first, second, and third horizontal parallel pivot rods and a plant container hanging the first horizontal pivot rod, which is balanced on the third horizontal pivot rod by an adjusting weight member slidably disposed at the third horizontal pivot rod through the second horizontal pivot rod. A water reservoir tank is operatively associated with the plant container so that as the plant container becomes lighter as to a loss of water. The adjusting weight member disposed at the third horizontal parallel pivot rod from the plant container disposed at the first horizontal pivot rod actuates a valve in the water reservoir tank through a connecting member mounted to one end portion of the second horizontal parallel pivot rod and transfer water from the water reservoir tank to the plant container until a balance is again achieved. When the balance is reached, the valve in the water tank is again closed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
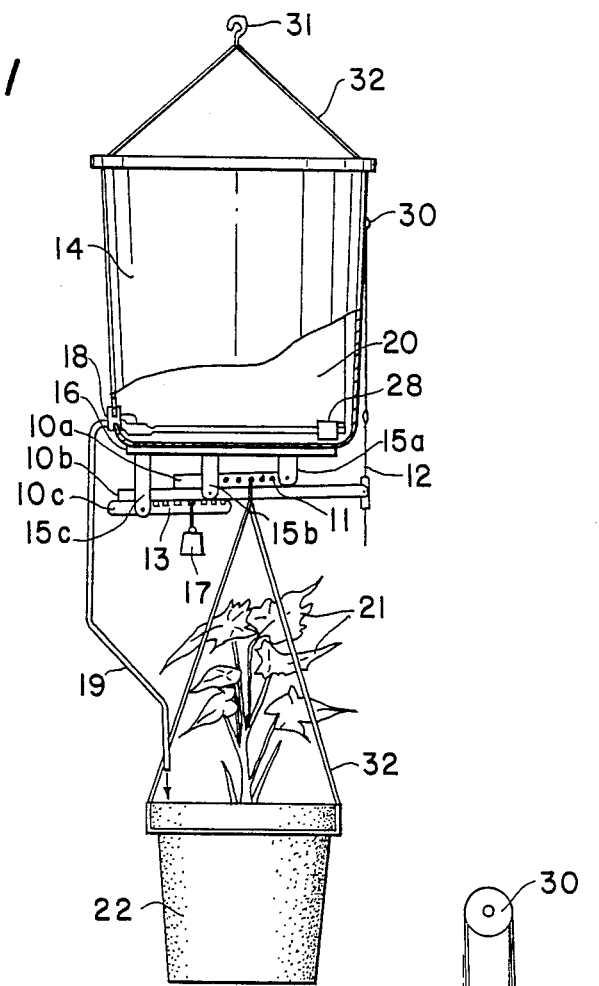
FIG. 1 is a side view of the automatic watering device for plants of the present invention.
Figure 2:
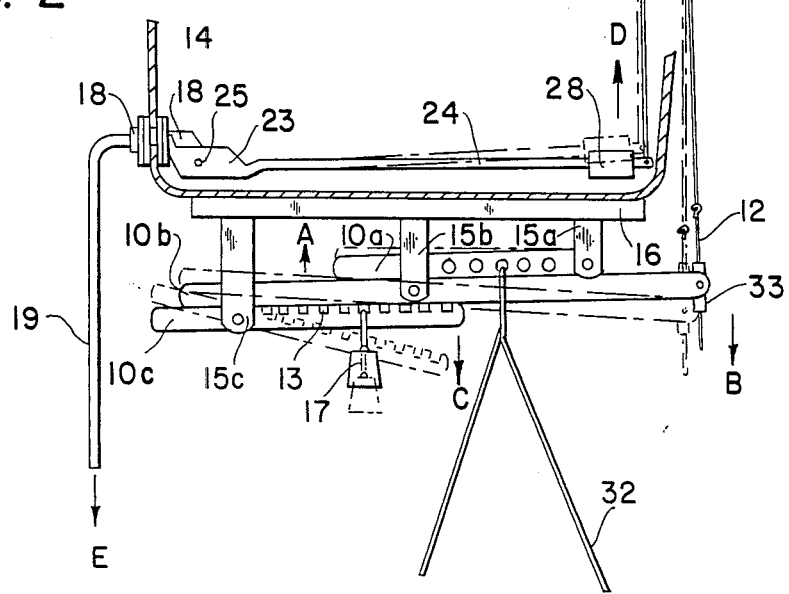
FIG. 2 is a side, partial sectional view of the basic components of the present invention showing the operation thereof.

Referring now in detail to the drawings for the purpose of illustrating the present invention, the watering device for plants as shown in FIGS. 1 and 2 comprises first, second and third horizontal parallel pivot rods 10a, 10b, and 10c wherein the first pivot rod 10a includes a plurality of apertures 11 disposed at the right end portion, the second pivot rod 10b is slidably connected to an adjustable connecting member 12, and the third pivot rod 10c includes a plurality of slots 13 disposed at the right end portion thereof, and a water reservoir tank 14 disposed over the horizontal parallel pivot rods 10a, 10b, and 10c. The horizontal pivot rod 10a, 10b, and 10c are pivotably provided at one portion thereof with first, second, third supporting members 15a, 15b, and 15c for pivotably supporting the horizontal parallel pivot rods 10a, 10b, and 10c. The supporting members 15a, 15b, and 15c are also fixed to a fixed supporting plate 16 for limiting the pivotal action of the horizontal pivot rods 10a, 10b, and 10c and for supporting the water reservoir tank 14. Thus the third horizontal pivot rod 10c is provided with the plurality of slots 13 disposed at the upper portion thereof for adjusting the position of an adjusting weight member 17. The first, second, and third horizontal parallel pivot rods 10a, 10b, and 10c are pivotably connected to the corresponding first, second and third supporting members 15a, 15b, and 15c by pivot pins 25, respectively.

Figure 3:
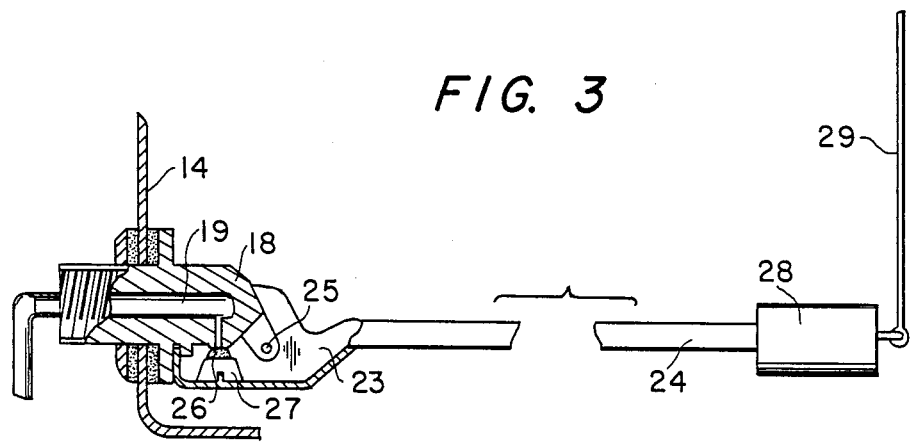
FIG. 3 is a side view of a valve member disposed in a water reservoir tank of the present invention showing in a cut away portion thereof the valve operatively connected to a drain pipe.

The water reservoir tank 14 supported by the fixed supporting plate 16 contains a drain hole gasket 18 disposed at the lower side wall thereof. The drain hole gasket 18 is adapted to receive a drain pipe 19 for draining the water 20 from the water reservoir tank 14 to plants 21 in a plant container 22. Also, the water reservoir tank 14 contains a valve member 23 extending a rod 24 which is pivotably connected to the drain hole member 18 by the pivot pin 25. The valve member 23 includes a rubber valve 26 attached to the left end portion thereof through a valve supporter 27 for mating with the end portion of the drain pipe 19 disposed in the drain hole member 18 to open and close the drain pipe 19 (FIG. 3).

The rod 23 is provided with a fixed weight member 28 attached to the right end portion thereof for closing the drain pipe 19, utilizing the rubber valve 26, by gravity of the fixed weight member 28. The right end of the second horizontal pivot rod 10b connects to the right end of the rod 24 by a string or a wire 29 which passes through a roller 30 disposed at the top portion of the water reservoir tank 14. The water reservoir tank 14 is provided with a hook 31 having a loop 32 for hanging the tank 14 on a wall, a ceiling or the like. Another hook 31 having the loop 32 is attached to the plant container 22 for hanging the container 22 from apertures 11 disposed in the right end portion of the first horizontal pivot rod 10a.

Figure 4:
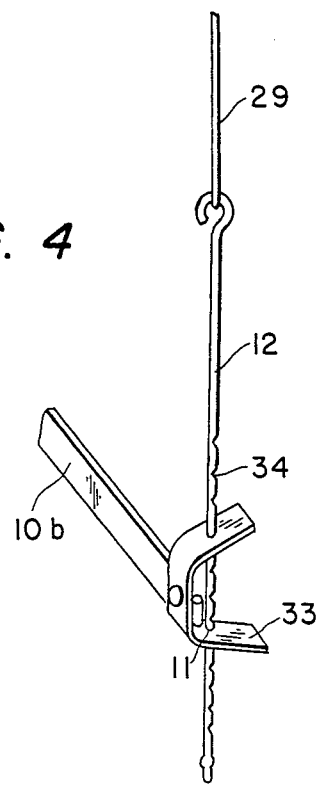
FIG. 4 is a perspective view of an adjustable connecting member of the present invention.

As shown in FIG. 4, the second horizontal pivot rod 10b is provided with an U-shaped connecting member 33 having apertures 11 and the U-shaped connecting member 33 is adapted to slidably engage the adjustable connecting member 12 by tightly engaging a plurality of light slots 34 disposed in the adjustable connecting member 12. The adjustable connecting member 12 is connected to one end of the wire 29 which is connected to the fixed weight member 28 at the other end thereof.

In operation, the water reservoir tank 14 containing water 20 and assembled with a valve system therein is hung from a special area such as a ceiling. After then, the plant container 22 with plants 21 and containing a proper amount of water is hung from one of the apertures 11 in the first horizontal pivot rod 10a. At this time, the adjusting weight member 17 is placed in the one of the slots 13 so as to balance the weight of the plant container 22.

As the water is gradually lost from the plant container 22, that is, the weight of the plant container 22 becomes lighter that its original weight, the left end of the first horizontal pivot rod 10a goes up in the direction indicated by arrow A and the right end of the second horizontal pivot rod 10b is lowered in the direction indicated by arrow B, due to the adjusting weight member 17 in direction indicated by arrow C as shown in FIG. 2. At this time, the string 29 thus, pulls the rod 24 in the direction as indicated by arrow D which opens the rubber valve 26 permitting water 20 to drain from the water reservoir tank 14 to the plant container 22 through the drain pipe 19 in the direction as indicated by arrow E (FIG. 2). As soon as the water 20 is sufficiently supplied to the plant container 22 to balance the plant container 22 against the adjusting weight member 17, the rubber valve 26 closes the end of the drain pipe 19 to stop the flow of water 20 to the plant container 22.

Accordingly, the device of the present invention automatically waters the plant container in a predetermined amount of water required for the plant. Thus, there is no need to manually water the plant since the device of the present invention automatically waters the plant until the water is exhausted which usually takes one to two months.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An automatic watering device for plants adapted to suspended from a wall or ceiling which comprises:

horizontal pivot rods composed of a first horizontal pivot rod having a plurality of apertures disposed at the right end portion thereof, a second horizontal pivot rod, and a third horizontal pivot rod having a plurality of slots disposed at the end portion thereof, said horizontal pivot rods being pivotably provided at one portion thereof with supporting members for supporting the horizontal pivot rods, said supporting members being provided with a fixed supporting plate for limiting the pivotal action of the horizontal pivot rods, an adjusting weight member hanging from one of said slots disposed at the other end portion of the third horizontal pivot rod, said adjusting weight member and a plant container hanging said first horizontal pivot rod being positioned in said slots to balance each other through said second horizontal pivot rod, a water reservoir tank adapted to contain a supply of water, said water reservoir tank being attached to said fixed supporting plate for mounting said supporting members to said fixed supporting plate, said water reservoir tank containing transfer means for conveying water from said water reservoir tank to said plant container, and valve means operatively associated with said transfer means for controlling the conveyance of water from said water reservoir tank to said plant container, said valve means being connected to said second horizontal pivot rod through connecting means, said connecting means including a connecting member connected to the end of the second horizontal pivot rod and an adjusting connector operatively connected to a wire which passes through a roller disposed at the top portion of said water reservoir tank and contents to said valve means whereby, upon the loss of water from the plan container, the horizontal pivot rods are caused to pivot, respectively, which opens the valve means permitting water to flow through the transfer means to the plant container until the balance is re-established causing the valve to close.

2. The automatic watering device of claim 1, wherein the transfer means is a drain hole disposed in the side bottom of the water reservoir tank and a drain pipe disposed in a drain hole gasket which is fixed within said drain hole for extending from said drain hole to the plant container, and the valve means being adapted to open and close said drain pipe depending on the balance portion of the horizontal pivot rods.

3. The automatic watering device of claim 1, wherein the valve means pivotably connected to said drain hole gasket includes a rod which is provided with a valve attached to one end portion and a weight member attached to the other end portion for closing said drain hole of the water reservoir tank, utilizing the valve means, by gravity of the weight member.

4. The automatic watering device of claim 1, wherein the connecting member has a U-shaped configuration and is provided with a pair of apertures disposed in the end portions thereof.

5. The automatic watering device of claim 1, wherein the adjusting connector includes a plurality of light slots for operatively engaging said connecting member.

* * * * *